United States Patent [19]

Noma et al.

[11] 4,219,598
[45] Aug. 26, 1980

[54] MOLDED ARTICLE, THE METHOD FOR MANUFACTURING THE SAME AND THE DIES THEREFOR

[75] Inventors: Kouichi Noma, Kenoshinmachi; Tsutomu Umeda, Ootsukimachi; Tsuneo Ogushi, Tsunatorimachi, all of Japan

[73] Assignees: Sanyo Electric Co., Ltd., Moriguchi; Tokyo Sanyo Electric Co., Ltd., Gunma Prefecture, both of Japan

[21] Appl. No.: 843,238

[22] Filed: Oct. 18, 1977

Related U.S. Application Data

[63] Continuation of Ser. No. 601,590, Aug. 4, 1975, abandoned.

[30] Foreign Application Priority Data

| Aug. 6, 1974 | [JP] | Japan | 49-90432 |
| Aug. 6, 1974 | [JP] | Japan | 49-90433 |
| Aug. 13, 1974 | [JP] | Japan | 49-92920 |
| Aug. 13, 1974 | [JP] | Japan | 49-92921 |
| Dec. 18, 1974 | [JP] | Japan | 49-146058 |

[51] Int. Cl.² .......................................... B32B 27/12
[52] U.S. Cl. ..................................... 428/161; 428/203; 428/204; 428/205; 428/286; 428/287; 428/187; 428/162; 428/172; 428/481; 428/246; 428/260; 428/340
[58] Field of Search ............... 428/203, 204, 205, 480, 428/481, 187, 286, 287, 246, 260, 340, 161, 162, 172; 264/257

[56] References Cited

U.S. PATENT DOCUMENTS

| 3,391,056 | 7/1968 | Robinson | 428/260 |
| 3,503,831 | 3/1970 | Oyama | 428/287 |
| 3,526,558 | 9/1970 | Beeson | 428/187 |
| 3,608,038 | 9/1971 | Smith | 264/257 |
| 3,732,137 | 5/1973 | Scher et al. | 428/172 |
| 3,756,901 | 9/1973 | Veneziale | 428/246 |
| 3,948,716 | 4/1976 | Fry | 428/246 |

*Primary Examiner*—John D. Smith
*Attorney, Agent, or Firm*—Hubbell, Cohen, Stiefel & Gross

[57] ABSTRACT

An ornamental molded article composed of a nonwoven fabric with a multicolored pattern and two synthetic resinous layers, between of which said nonwoven fabric is intervening, and the method and dies employed in its manufacture.

4 Claims, 3 Drawing Figures

MOLDED ARTICLE, THE METHOD FOR MANUFACTURING THE SAME AND THE DIES THEREFOR

This is a continuation, of application Ser. No. 601,590, filed Aug. 4, 1975, now abandoned.

BACKGROUND OF THE INVENTION

1. Field of the Invention

This invention relates to a molded article, the method for manufacturing the same and the dies therefor. More particularly, this invention relates to an ornamental molded article composed of two synthetic resinous layers, and a nonwoven fabric layer with a multi-colored pattern which lies between the two synthetic resinous layers and the method and dies employed in its manufacture.

The molded article provided by this invention shows an outer appearance of marble, granite, graining or other desirable patterns of colors, and can be employed for every utility to which conventional synthetic resinous material for structure have been employed, for example, building materials, e.g., case slabs, panels, units such as a desk, a table, a washing stand, a sink or a bathtub or the like, and miscellaneous goods in which natural stones such as marbles or granite or artificial stones are used.

2. Description of the Prior Art

Hitherto, various artificial stones such as artificial marbles have been known and available commercially. These artificial marbles are composed of a thin and transparent resinous layer of so-called gel-coating as a covering which covers a basic layer with a pattern of marble. The coating compensates for the lack of resistance to chemicals, of the basic layer while providing a gloss and hardness on the surface to the basic layer. The basic layer of the conventional artificial marbles comprises resins, fillers and pigments, and their marble patterns are given by utilizing a difference in fluidity of each component in the basic layer. However, one needs a high skill in technique to repeatedly produce an artificial marble having an uniform pattern and quality, because the marble pattern in this technique is changeable according to a slight difference in mixing ratio of each component, to the degree of mixing and the speed of molding of the composition for the basic layer, and other conditions which affect fluidity of the composition.

SUMMARY OF THE INVENTION

Course, of the study of seeking more desirable artificial marbles, the inventors of this invention have found that such shortcomings in the known artificial marbles could be improved by the molded article provided by this invention, wherein a nonwoven fabric with a multicolored pattern is held between a transparent resinous covering layer and a resinous basic layer. The covering layer is composed of a synthetic resin which provides a thin and transparent resinous layer and, when desired, an accelerator, a catalyst and the like therefor, and said basic layer being composed of at least a thermosetting resin.

According to this invention, a molded article with a desired multicolored pattern can be manufactured by a simple process. A repeated production of the molded article with a uniform pattern, without any unfavorable results such as overlapping or breaking off may be attained by providing a nonwoven fabric between two resinous layers, because the nonwoven fabric can easily fit along with an uneven surface of the article and rarely tear and shrivel, as in the case with.

Sometimes, it is impossible even for a nonwoven fabric which has elasticity in itself, to fit the nooks or corners of shaped articles. In such cases, they can be covered by arranging a nonwoven fabric by the turning up of twisting or pieces of the nonwoven fabric. However, such arrangement causes overlapping of a pattern and is not desirable in view of design. The overlapping can be overcome by cutting extra parts of the nonwoven fabric in overlapping, but this sometimes results in breaking off of the nonwoven fabric which results with the baisc layer appearing between the parts of the breaking off. In order to avoid such undesirable conditions at the nooks or corners in shaped article, it has been found that the basic resinous layer with the same color as or similar to that of the background in the nonwoven fabric may mask and quiet such undesirable situations, without giving any unnatural views on the pattern, whereby there can be provided a more valuable molded article having a clear color in the background and being excellent particularly in design.

It, therefore, is an object of the invention to provide an ornamental molded article having a desired multicolored pattern which is given by a nonwoven fabric with a multicolored pattern between a transparent synthetic resinous covering layer and a synthetic basic layer.

It is another object of the invention to provide a composition for the synthetic basic layer, which is also suitable for molding under pressure.

Still another object of the invention is to provide a press molding process for manufacturing the ornamental molded article which gives a high operating efficiency and is suitable for mass-production.

A further object of the invention is to provide dies suitable for manufacturing the ornamental molded article.

Additional objects and features of the invention will become apparent from the descriptions of the specification and the claims which follow.

Figure 1:
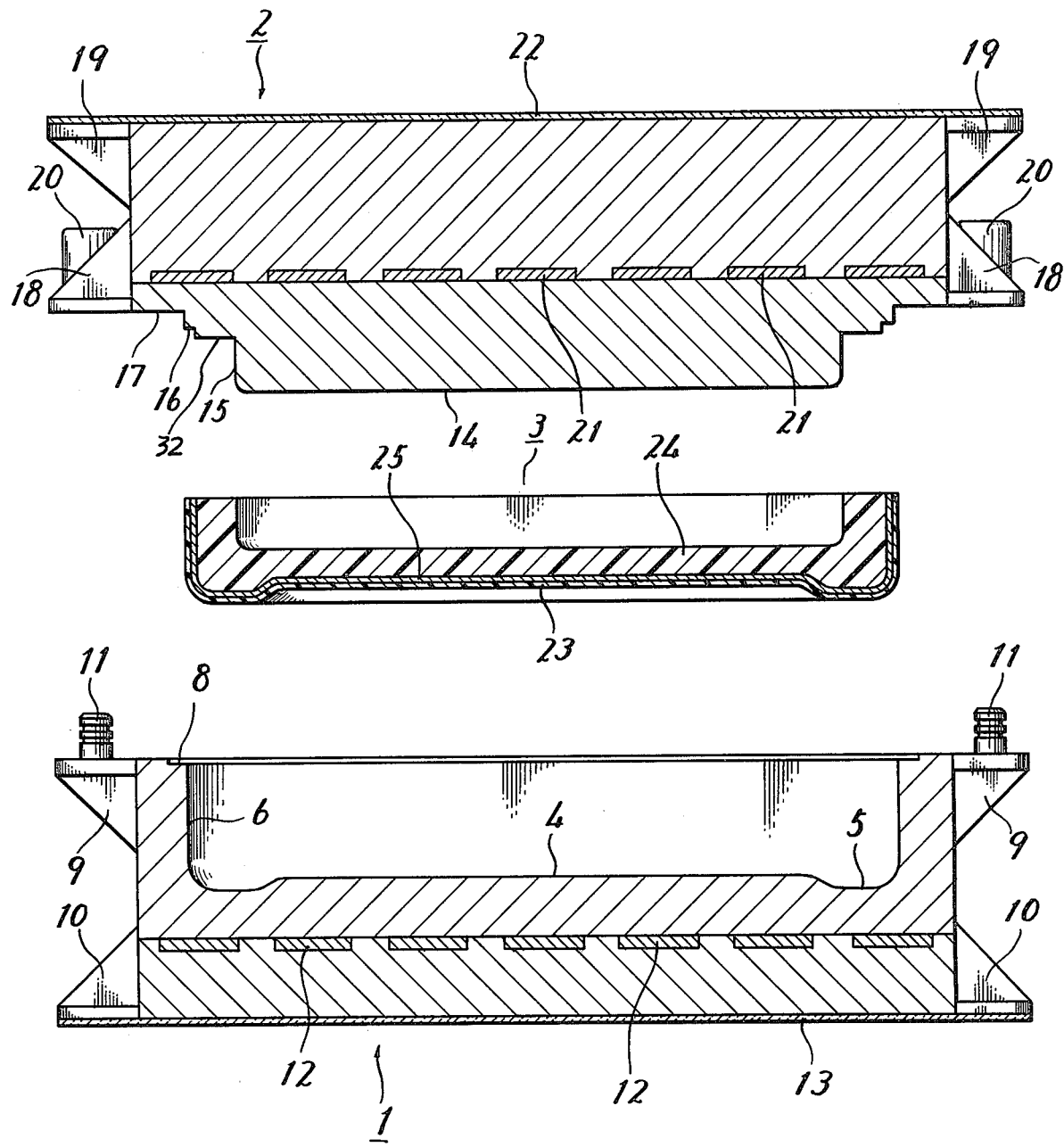
FIG. 1 is a side cross-sectional view of a pair of dies, lower die 1 and upper die 2, and an article (trimmed) 3 to be prepared by said two dies.

The transparent synthetic resinous covering layer of the molded article in the invention is a thin and transparent coating which can protect the surface of the molded article and through which a colored pattern on a nonwoven fabric can appear, and is possessed of desirable resistance to chemicals, suitable hardness and gloss on the surface, and the like.

As examples of the covering layer having desirable characteristics include gelcoatings utilized for manufacturing artificial marbles. More particularly, the gelcoating is a very thin and transparent coating of about 0.2 to 0.5 mm, comprising transparent synthetic resins such as unsaturated polyesters, saturated polyesters, styrene monomer or the like, which are known generally as gelcoat resin on the market and which include, when desired, accelerators and catalysts therefor.

The nonwoven fabric used in the invention is a sheet of fabric wherein the fibers are bonded to one another by aid of a binding agent or by their own adhesiveness, and arranged by a suitable manner as in a web or mat.

Examples of fibers to be used to form the nonwoven fabric are cotton, rayon, acetate, nylon, polyester and the like, as well as two or more kinds of fibers. Preferred nonwoven fabric used in the invention is of 10 to 50 $g/m^2$ for conventional manufacturing processes, but of 10 to 30 $g/m^2$ for molding under pressure in accordance with this invention. Furthermore, it is highly recommended to choose a suitable nonwoven fabric which may fit and match to the covering and basic layers so as to form desired molded products.

The nonwoven fabric used in the invention is given a pattern with one or more colors by conventional methods, and the most preferred one for printing a pattern thereon comprises printing a desired pattern on paper, setting the paper on the nonwoven fabric and pressing it, whereby the pattern is transferred on the fabric. According to the method, it is possible to produce a nonwoven fabric printed with the identical and uniform colored pattern in large quantity.

Thus the printed and colored nonwoven fabric is provided between the transparent covering layer and the resinous basic layer, and therefore the pattern and colors may clearly appear through the thin and transparent covering layer which has an almost uniform thickness. Furthermore, it becomes possible to produce the molded article having identical colored patterns. The side with the pattern of the nonwoven fabric is, of course, to be arranged so as to be attached to the covering layer in the course of molding.

The resinous basic layer of the invention is composed of a thermosetting resin, a thermoplastic resin, additives such as fillers, accelerators, catalysts and the like.

Conventional thermosetting resins can be employed such as unsaturated polyester resins, epoxy resins, phenol resins, guanamine resins, urea resins or melamine resins, among which unsaturated polyester resins (prepared, for example, from maleic anhydride, phthalic anhydride, ethylene glycol, propyleneglycol or the like) are preferably employed. Not only one kind of these resins but a mixture of the two or more kinds of these resins can be used for the composition of the basic layer.

In order to accelarate curing of the above thermosetting resin, a cross-linking agent such as a vinyl or allyl monomer may be added to said composition.

The addition of the thermoplastic resin to said composition is, though not essential, helpful to prevent it from cracking, as it can to control the degree contraction of the composition. Suitable thermoplastic resins include polyethylene resins or polyester resins and these are usually employed in a styrene solution.

Suitable fillers used in said composition include calcium carbonate, clay, talc, alumina, diatomaceous earth, barium sulfate and the like. Two or more kinds of these fillers may be employed as a mixture.

To said composition for the synthetic resinous basic layer may be added, when desired, coloring agents to give it the color same as or similar to that of the background of the nonwoven fabric used. Herein, the color of background means the one occupying a large space on the surface of the nonwoven fabric. For example, a white coloring agent will be used in case of producing an artificial white marble. The coloring is usually carried out by using two or more coloring agents in mixture. Pigments are usually employed as the coloring agents. The amount to be added to the composition is dependent on the amount of resins contained in said composition and, for example, is approximately 2 to 4% by weight of that of the resins.

Suitable catalysts include t-butyl peroxy-2-ethylhexanoate, benzoylperoxide, t-butyl peroxyisobutyrate, methylethyl ketone peroxide and the like. Also suitable accelerators include cobalt naphthenate, magnesium naphthenate, dimethylaniline, N,N-dimethyl-p-toluidine and the like. They are usually employed jointly and, for example, a combination of t-butyl peroxy-2-ethylhexanoate and cobalt napthenate is preferably used when unsaturated polyester resin is used as the thermosetting resin.

Some of these catalysts and accelerators are also usable for the covering layer.

The above examples of the catalysts and accelerators are each optimumly used in case that curing according to the invention is carried out at 70°~90° C. By the addition of these agents to the composition for the basic layer, they may not become hard, even when allowed to stand at an ordinary temperature, and may be convenient for preservation.

The ratio of the resins and other components in the basic layer composition can be referred to conventional ones, but will be given embodically below about the composition suitable for the press molding which has been developed by this invention.

In said composition for the press molding, the total amounts of the thermosetting and the thermoplastic resin which is added optionally, are preferred to be within a range of approximately 16 to 20% by weight. The content of the resins among this range makes the composition of the basic layer half-fluid, and the composition in such condition can be easily handled, as it is extensible to every nook and corner of dies for shaped articles. In addition, the fluidity also enables penetration of the composition into the nonwoven fabric, whereby the appearance of pin-hole will be decreased.

Another index to determine such a desired fluidity of said composition for basic layer may be represented by a value given in a test of cone penetration of said composition. The test on cone penetration of the composition was carried out according to the description of JIS K2524 as well as ASTM D217, but excepting heating to 82° C.±3° and changing the measuring temperature of 25° C.±0.5° into 20° C.±1°. The composition possessing of a desired fluidity for the purpose of this invention was 200 to 220.

The resinous basic layer composition which contains about 16~20% of the resins may be cured under pressure approximately at 70°~90° C., at a temperature among which the gel-coating as the covering layer can be molded and hardened.

The pressure is not particularly limited, but preferred pressure is under a low one such as under approximately 36 $Kg/cm^2$. Under these conditions, the article can be produced within curing period of 10 minutes or so, and accordingly efficiency of the production is remarkably increased, compared with that of conventional methods.

Nextly, typical procedures according to the press molding of the invention are shown as follows.

(1) pre-heating the interior surface of dies at 70° to 90° C., (2) cleaning up the interior surface of said dies, (3) applying a releasing agent thereon, (4) applying a composition for the covering layer on the lower die, (5) curing said resinous compostion in the dies, the interior surface of which is heated at 70° to 90° C. to form the transparent resinous covering layer, (6) providing a nonwoven fabric with colored pattern on the thus formed covering layer, preferable while the bottom part of said covering layer in the dies has become hard and the upside does not harden, because said covering layer and nonwoven fabric are aimed to adhere each other more closely in such a condition, (7) providing dough of a composition for basic layer thereon, (8) curing the thus stratified material in the dies under increasing pressure at about 36 Kg/cm$^2$ and keeping the interior surface of the dies at 70° to 90° C., (9) recovering the product from the dies and subjecting it to self-curing by leaving it to stand in atomosphere, trimming and inspecting it to produce the molded article, which shows the same colored pattern on the nonwoven fabric.

Moreover, preferred dies to be used for the molding under pressure as explained above are shown as follows.

DESCRIPTION OF THE PREFERRED EMBODIMENTS

Figure 2:
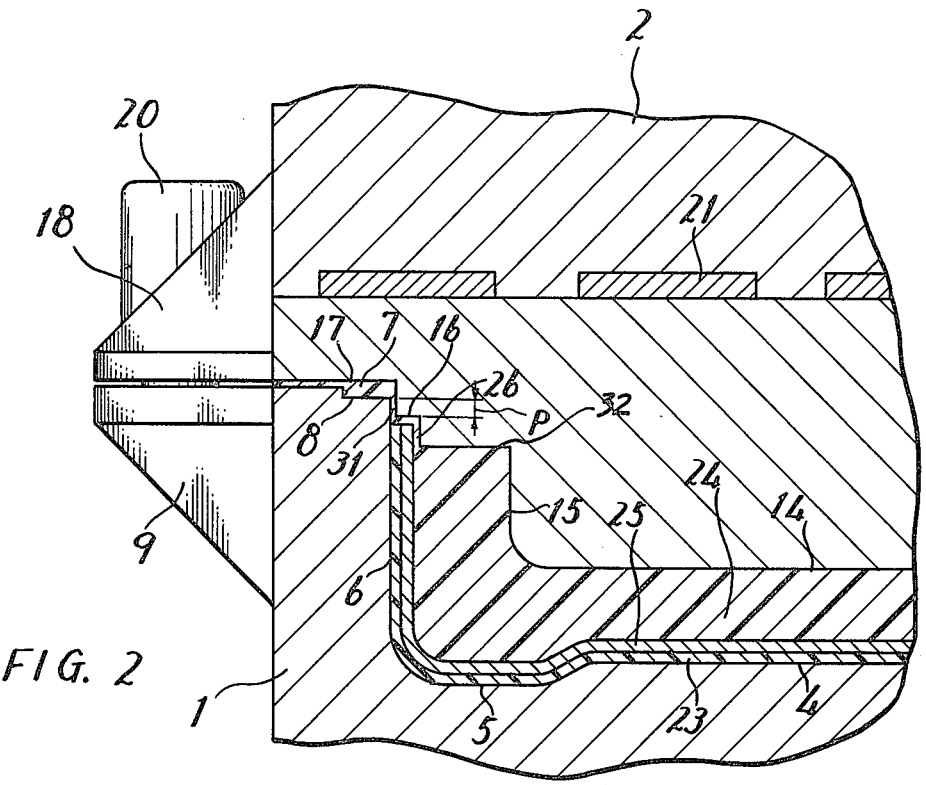
FIG. 2 is a side cross-sectional enlarged view of a characteristic part of said two dies 1 and 2 being attached to each other, into which compositions to be molded are placed.
Figure 3:
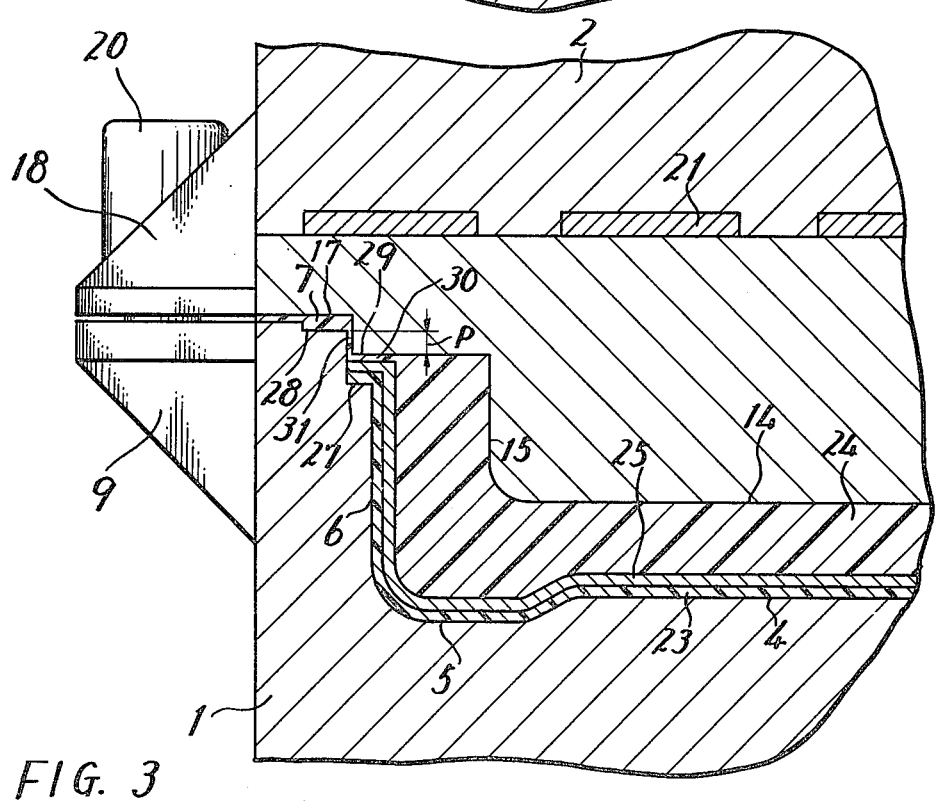
FIG. 3 is a side cross-sectional enlarged view of a characteristic part which is modified from the above characteristic part in FIG. 2.

Referring to FIGS. 1, 2 and 3, the lower die 1 has a multi planar surface comprised of a flat 4, an annular dent 5 around the flat 4 and a vertical inner wall 6 which serve for the formation of the article's surface, and a rounded stepped cut 8 adjacent to the top of the vertical inner wall 6. And the lower die 1 has upper ribs 9, 9, lower ribs 10, 10, guide pins 11, 11 on each of the upper ribs 9, 9 which serve for the leading of the upper die 2, and a suitable number of heaters 12, 12—and a heat insulator 13.

The upper die 2 has a multi planar surface including a flat 14 and a vertical outer wall 15 which correspond to the flat 4 and the vertical inner wall 6 of the lower die 1 respectively, a rounded lower stepped projection 16 and a rounded upper stepped projection 17 adjacent to the side of a ceiling 32 followed by the vertical outer wall 15. Further, the upper die 2 has upper ribs 19, 19, lower ribs 18, 18, guide pin bushings 20, 20 set on the lower ribs 18, 18, a suitable number of heaters 21, 21—and a heat insulator 22.

The article (trimmed) 3 which can be used as a table-top or so is composed of a nonwoven fabric 25 of 0.4~0.6 mm in thickness intervening between a transparent synthetic resinous covering layer 23 and a synthetic resinous basic layer 24.

Now, when the lower die 1 and the upper die 2 are attached to each other, a groove 26 is formed between the vertical inner wall 6 and the rounded lower stepped projection 16, a pinch 31 of about 0.5 mm interval between the inner vertical wall 6 and the rounded upper stepped projection 17 and about 15 mm in length P, and a small room 7 between the rounded stepped cut 8 and the rounded upper stepped projection 17.

Especially referring to FIG. 3, the lower die 1 has a rounded lower stepped cut 27 adjacent to the top of the vertical inner wall 6 and a rounded upper stepped cut 28 adjacent to the stepped cut 27. The upper die 2 has ceiling 29 followed by the vertical outer wall 15 and a rounded stepped projection 17 adjacent to the side of the ceiling 29. When the lower die 1 and the upper die 2 are attached to each other, a groove 30 is formed between the rounded lower stepped cut 27 and the ceiling 29, a pinch 31 between the rounded lower stepped cut 27 and the rounded upper stepped projection 17 and also a small room 7 between the rounded upper stepped cut 28 and the rounded stepped projection 17.

The pinch 31 is useful for putting the composition for the synthetic resinous basic layer 24, into every nook of corner of the cavity formed by the dies and also the small room 7 serves a control of letting loose said a little excess amount of the composition.

Further, the grooves 26 and 30 which are considered as a specific feature of the dies are useful for the press molding of using the nonwoven fabric and the synthetic resinous covering layer therefor in accordance with the invention, because of preventing of formation of creases, folds, cracks, flaws or the like of the article 3 and also of easily separation of the upper die 2 from the lower die 1 after molding. The width of the grooves 26 and 30 is needed to be a little broader (e.g., 1 mm) than a width between the covering layer 23 and the nonwoven fabric 25.

The following examples serve to illustrate the various embodiments of this invention without any limitation thereto. In the examples, all of "parts" mean parts by weight.

EXAMPLE 1

| 1) Composition for covering layer: | |
| --- | --- |
| Polylite GC-230 (unsaturated polyester resin supplied by Dainippon Ink and Chemicals Inc., Japan) | 98.5 parts |
| Catalyst, methylethylketoneperoxide (supplied by Nippon Oils and Fats Co., Ltd., Japan) | 1.0 parts |
| Accelerator, RP-126 (styrene solution of dimethylaniline supplied by Dainippon Ink and Chemicals Inc.) | 0.5 parts |
| 2) Nonwoven fabric: | |
| JH-30015 (15 g/m$^2$) (supplied by Nippon Birine, Japan) | |
| 3) Composite for basic layer: | |
| Polylite TP-100 (unsaturated polyester supplied by Dainippon Ink and Chemicals Inc.) | 18.0 parts |
| Polylite TP-900 (styrene solution of saturated polyester resin) | 2.0 parts |
| Calcium carbonate #300 (supplied by Shiraishi Calcium Co.) | 79.4 parts |
| t-Butyl peroxy-2-ethylhexanoate (Nippon Oils and Fats Co. Ltd.) | 0.4 parts |
| 6% Cobalt naphthenate (Dainippon Ink and Chemicals Inc.) | 0.2 parts |

First, the composition for covering layer containing the catalyst and the accelerator was applied on lower die and heated the interior surface of dies at 85° C. to form the gelcoating layer of 0.3 mm in thickness. During the upside of the covering layer being not yet hardened, the side with a pattern of the nonwoven fabric was ascertainly fixed just on said covering layer. The resinous basic composition as mentioned above was provided thereon, after being sufficiently admixing in a mixer, and then pressed thus stratified material at 36 Kg/cm$^2$ in the dies, the interior surface of which was heated at 85° C.

After about six minutes, the product was recovered from the dies and subjected to trimming. It defines a lower multi planar surface composed of surface 23 and the edge configuration. After removal, it is self-curing in atomosphere by being allowed to stand for 30 minutes to provide an ornamental molded article with a marble pattern and colors on the nonwoven fabric.

EXAMPLE 2

| 3) Composition for basic layer: | |
|---|---|
| Polylite TP-100 | 16.2 parts |
| Polylite TP-900 | 1.8 parts |
| Calcium carbonate #300 | 81.4 parts |
| t-Butyl peroxy-2-ethylhexanoate | 0.4 parts |
| 6% Cobalt naphthenate | 0.2 parts |

In using the same kind and amount of covering layer and nonwoven fabric as in Example 1, the above resinous basic layer composition was treated in a similar way to that of Example 1 to form a molded article with a marble pattern.

EXAMPLE 3

| 1) Composition for covering layer: | |
|---|---|
| Polylite GC-230 (unsaturated polyester resin, Dainippon Ink and Chemical Inc.) | 98.5 parts |
| Catalyst, methylethylketoneperoxide | 1.0 parts |
| Accelerator, RP-126 | 0.5 parts |
| 2) Nonwoven fabric: | |
| JH-30015 (15 g/m$^2$) | |
| Composition 18.0 basic layer: | |
| Polylite TP-100 | 18.0 parts |
| Polylite TP-900 | 2.0 parts |
| a) For white marble pattern | |
| J-107 (titanium oxide supplied by Dainippon Ink and Chemicals Inc.) | 0.6 parts |
| Calcium carbonate #300 | 78.8 parts |
| b) For blue marble pattern: | |
| J-310 (Iron black) | 0.23 parts |
| J-831 (Prussian blue) | 0.23 parts |
| Calcium carbonate #300 | 78.94 parts |
| c) For yellow marble pattern: | |
| J-601 (Chrome yellow), J-310 and J-550 (Molybdate orange) in the ratio of 8.8:7:5 | 0.16 parts |
| Calcium carbonate #300 | 79.24 parts |
| Catalyst, t-butyl peroxy-2-ethylhexanoate | 0.4 parts |
| Accelerator, 6% cobalt naphthenate | 0.2 parts |

Each of the combination as mentioned above was treated in the same way with that of Example 1 to form the product.

EXAMPLE 4

| 3) Composition for basic layer: | |
|---|---|
| Polylite- TP-100 | 14.4 parts |

| -continued | |
|---|---|
| 3) Composition for basic layer: | |
| Polylite TP-900 | 1.6 parts |
| a) For white marble pattern: | |
| J-107 | 0.6 parts |
| Calcium carbonate #300 | 82.8 parts |
| b) For blue marble pattern: | |
| J-310 | 0.23 parts |
| J-831 | 0.23 parts |
| Calcium carbonate | 82.94 parts |
| c) For yellow marble pattern: | |
| J-601, J-310 and J-550 in the ratio of 8.8 : 7 : 5 | 0.16 parts |
| Calcium carbonate #300 | 79.24 parts |
| Catalyst, t-butyl peroxy-2-ethylhexanoate | 0.4 parts |
| Accelerator, 6% cobalt naphthenate | 0.2 parts |

The application of the same manner as described in Example 1 to the above mentioned material (3) and the materials (1) and (2) in Example 1 gave a similar result to that of Example 3.

What we claim is:

1. A monolithic ornamental molded shaped three-dimensional article which simulates marble or granite comprising a shaped transparent cover layer of thermosetting synthetic resin defining a continuous multiplanar shaped decorative surface, a structural base layer including an integrally formed thermosetting synthetic resin body having a continuous shaped surface generally conforming to and underlying said multiplanar shaped decorative surface and an intermediate layer disposed between and bonded to said shaped cover layer and said shaped base layer, said intermediate layer comprising a flaccid non-woven fabric sheet having a density of between about 10 and 30 grams/meter$^2$ and being provided with a multicolored pattern thereon, one of said colors being a background color, said structural base layer being substantially the same color as said background color, said structural base layer having a thickness substantially greater than the thickness of said shaped transparent cover layer whereby said ornamental molded article is shaped through its cross-section and constitutes a structural supportive article having a shaped multiplanar decorative surface.

2. The article of claim 1 wherein said thermosetting synthetic resins for said cover layer and for said base layer comprise an unsaturated polyester which has been cured.

3. The article of claim 2 wherein said base layer additionally comprises a synthetic thermoplastic resin admixed with said unsaturated polester.

4. The article of claim 3, wherein said thermoplastic resin is a saturated polyester and the multicolored pattern on the non-woven fabric intermediate layer cooperates with the structural base layer and the cover layer to simulate marble or granite.

* * * * *

UNITED STATES PATENT OFFICE
CERTIFICATE OF CORRECTION

Patent No. 4,219,598          Dated August 26, 1980

Inventor(s) NOMA et al

It is certified that error appears in the above-identified patent and that said Letters Patent are hereby corrected as shown below:

Column 1, line 52: "Course," should read -- In the course --.

Column 2, line 4: "with." should read -- with paper. --.

Column 7, line 30: "Composition 18.0 basic" should read -- Composition for basic --.

*Signed and Sealed this*

*Seventh* Day of *April 1981*

[SEAL]

*Attest:*

RENE D. TEGTMEYER

*Attesting Officer*      *Acting Commissioner of Patents and Trademarks*